(12) United States Patent
Zhou

(10) Patent No.: US 9,667,479 B2
(45) Date of Patent: May 30, 2017

(54) METHOD AND APPARATUS FOR PERIODICAL PROTOCOL PACKET TRANSMISSION BY NETWORK DEVICE

(71) Applicant: ZTE CORPORATION, Shenzhen, Guangdong (CN)

(72) Inventor: Ji Zhou, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/439,694

(22) PCT Filed: Jul. 23, 2013

(86) PCT No.: PCT/CN2013/079850
§ 371 (c)(1),
(2) Date: Apr. 30, 2015

(87) PCT Pub. No.: WO2013/182162
PCT Pub. Date: Dec. 12, 2013

(65) Prior Publication Data
US 2015/0295755 A1 Oct. 15, 2015

(30) Foreign Application Priority Data
Oct. 30, 2012 (CN) .......................... 2012 1 0423945

(51) Int. Cl.
*H04L 12/24* (2006.01)
*H04L 12/12* (2006.01)
(Continued)

(52) U.S. Cl.
CPC .......... *H04L 41/0803* (2013.01); *H04L 12/12* (2013.01); *H04L 45/02* (2013.01);
(Continued)

(58) Field of Classification Search
CPC ..... H04L 41/0836; H04L 12/12; H04L 45/02; H04L 47/56; H04L 47/562; H04L 69/18
See application file for complete search history.

(56) References Cited

U.S. PATENT DOCUMENTS 8,989,199 B1 * 3/2015 Sella ....................... H04L 45/42
370/395.31
9,013,999 B1 * 4/2015 Kondapalli ......... H04L 12/2657
370/235.1
(Continued)

FOREIGN PATENT DOCUMENTS

| CN | 1725732 A | 1/2006 |
|---|---|---|
| CN | 102347909 A | 2/2012 |
| CN | 102938722 A | 2/2013 |

OTHER PUBLICATIONS

PCT International Search Report Dated Oct. 31, 2013, Application No. PCT/CN2013/079850, 4 Pages.

*Primary Examiner* — Chi H Pham
*Assistant Examiner* — Weibin Huang
(74) *Attorney, Agent, or Firm* — Brooks Kushman P.C.

(57) ABSTRACT

The embodiment of the present document provides a method and apparatus for periodically transmitting a protocol packet by a network device, which relate to the communications technology. The method includes: identifying one or more physical ports of the network device; identifying one or more instances, under each physical port, which need to periodically transmit the protocol packet; performing delay processing on packet transmission start-up time of a plurality of instances when the plurality of instances request a processor to transmit protocol packets at the same time, so as to form a sequence of packet transmission start-up delay time corresponding to the plurality of instances; and the processor periodically transmitting each protocol packet of
(Continued)

the corresponding instance according to the sequence of the packet transmission start-up delay time.

15 Claims, 2 Drawing Sheets

(51) Int. Cl.
*H04L 12/751* (2013.01)
*H04L 29/06* (2006.01)
*H04L 12/875* (2013.01)

(52) U.S. Cl.
CPC ............ *H04L 47/56* (2013.01); *H04L 47/562* (2013.01); *H04L 69/18* (2013.01); *Y02B 60/34* (2013.01)

(56) References Cited

U.S. PATENT DOCUMENTS

| | | | | |
|---|---|---|---|---|
| 2008/0186875 | A1* | 8/2008 | Kitani | H04L 41/0816 370/254 |
| 2010/0272108 | A1* | 10/2010 | Mack-Crane | H04L 12/4625 370/392 |
| 2014/0372576 | A1* | 12/2014 | Mohandas | H04L 41/0803 709/220 |
| 2015/0071070 | A1* | 3/2015 | Borlick | H04L 47/39 370/235 |

\* cited by examiner

METHOD AND APPARATUS FOR PERIODICAL PROTOCOL PACKET TRANSMISSION BY NETWORK DEVICE

CROSS-REFERENCE TO RELATED APPLICATIONS

This application is a U.S. national phase of PCT Application No. PCT/CN2013/079850 filed Jul. 23, 2013, which claims priority to Chinese Application No. 201210423945.5 filed Oct. 30, 2012, the disclosures of which are incorporated in their entirety by reference herein.

TECHNICAL FIELD

The present document relates to the communication technology, and in particular, to a method for periodically transmitting a protocol packet by a network device by adopting a delay mechanism and a related apparatus.

BACKGROUND OF THE RELATED ART

In recent years, with the fast popularization and popularizing of the Internet, the network performance gradually becomes the focus to which people pay close attention. In the existing network, various generally recognized standard protocols and manufacturer privately owned protocols are applied extensively, and key devices forming that network, such as, a router, a switchboard, a Broadband Remote Access Server (BRAS), the firewall, the host computer, etc., all need to maintain and deal with the various protocols therein.

The processing to the protocols by the network device is usually performed by a processor (the central processing unit (CPU), the network processor (NP), etc.); and when the device needs to send a large number of protocol packets within a short time, it might be unable to send so much packets because the processor is busy. The ability of the processor itself is limited, and with the increasing of the network applications, the demand of transmitting the messages may be increased unlimitedly, so how to guarantee all the messages be sent out successfully becomes the problem needed to be solved urgently.

Usually the protocol message transmission is divided into two types, one is that the message needs to be immediately transmitted once, and the other one is that the message needs to be transmitted periodically. The former, due to the transmission has no regularity, usually occurs at a protocol initialization phase and the message quantity is little, thus there is no need to optimize the packet transmission performance, for example, establishment of an FTP connection. The latter message is transmitted periodically and is usually used for the maintenance of the connection or the detection of neighbors; because a problem of transmission synchronization generally exists, it will lead to overload of the CPU in a short time, thereby causing problems that the neighbor is disconnected, and the protocol is overtime, etc.

Due to periodic packet transmission of the protocol, when the device has multiple ports required to transmit the packets and their packet transmission intervals are the same, it makes the CPU of the device to be overload, then the transmitting of messages is seriously affected, and meanwhile it may further influence the receiving process of the protocol messages at a receiving end. By taking a link layer discovery protocol LLDP as an example, after the LLDP protocol is started, all the ports in UP will be detected, and then the LLDP messages are periodically transmitted at the ports in UP respectively. Because the time for detecting all the ports in UP in turn is very short, all the ports in UP nearly synchronously transmit the LLDP messages. If there are 64 ports in UP, then the CPU will send out 64 LLDP messages at one time, and then sends the 64 LLDP messages once every other cycle. And by further taking an edge virtual bridge EVB protocol mentioned in an IEEE 802.1Qbg protocol as an example, its EVB TLV is carried in the LLDP message. If there are 1000 virtual interfaces in one physical port and their transmission cycles of EVB TLVs are same, then 1000 LLDP messages will be transmitted every other cycle; and if all the 64 ports transmit at the same time, then the CPU needs to transmit 64000 LLDP messages at one time.

SUMMARY

The embodiment of the present document provides a method and apparatus for periodically transmitting a protocol packet by a network device, which can better solve the problem that the burden of a processor is overload when transmitting a large number of protocol messages once, to ensure dependability and stability of protocol operation.

An embodiment of the present document provides a method for periodically transmitting a protocol packet by a network device, comprising:

identifying one or more physical ports of the network device;

identifying one or more instances, under each physical port, which need to periodically transmit the protocol packet;

performing delay processing on packet transmission start-up time of a plurality of instances when the plurality of instances request a processor to transmit protocol packets at the same time, so as to form a sequence of packet transmission start-up delay time corresponding to the plurality of instances; and the processor periodically transmitting each protocol packet of the corresponding instance according to the sequence of the packet transmission start-up delay time.

Preferably, the method further comprises: comparing packet transmission cycles of the plurality of instances, obtaining a minimum packet transmission cycle, and taking the minimum packet transmission cycle as a packet transmission cycle T of the network device.

Preferably, the step of the delay processing comprises:

determining a packet transmission start-up delay time of the physical port according to an identification of the physical port and the packet transmission cycle T of the network device, and determining a packet transmission start-up delay time of an instance with the corresponding identification under each physical port according to the packet transmission start-up delay time of the physical port and instance identification(s) under the physical port, and obtaining the sequence of the packet transmission start-up delay time corresponding to the plurality of instances.

Preferably, the packet transmission start-up delay time $\tau_1$ of the physical port is calculated through the following formula:

$$\tau_1 = (T/m)*(x-1)$$

wherein, m is a total number of the physical ports, x is a serial number of the physical port, and $1 \leq x \leq m$.

Preferably, the packet transmission start-up delay time $\tau_2$ of the instance with the corresponding identification is calculated through the following formula:

$$\tau_2 = (T/m)*((x-1)+(y-1)/n)$$

wherein, n is a total number of the instances under the x$^{th}$ physical port, y is a serial number of an instance under the x$^{th}$ physical port, and $1 \leq y \leq n$.

Preferably, in a first packet transmission cycle of the network device, the protocol packets of the plurality of instances are transmitted in turn according to the sequence of the packet transmission start-up delay time, and in subsequent packet transmission cycles, the protocol packets of the plurality of instances are transmitted periodically according to the packet transmission cycle T.

Preferably, the instances comprise virtual interfaces, protocols or sub protocols.

Another embodiment of the present document provides an apparatus for periodically transmitting a protocol packet by a network device, comprising:

an identification module, configured to: identify one or more physical ports of the network device, and identify one or more instances, under each physical port, which need to periodically transmit the protocol packet;

a delay processing module, configured to: perform delay processing on packet transmission start-up time of a plurality of instances when the plurality of instances request a processor to transmit protocol packets at the same time, and form a sequence of packet transmission start-up delay time corresponding to the plurality of instances; and a packet transmission module, configured to: periodically transmit the protocol packet of the corresponding instance according to the sequence of the packet transmission start-up delay time.

Preferably, the delay processing module comprises:

a network device packet transmission cycle calculation submodule, configured to: compare packet transmission cycles of the plurality of instances, obtain a minimum packet transmission cycle, and taking the minimum packet transmission cycle as a packet transmission cycle T of the network device;

a network device packet transmission start-up delay time calculation submodule, configured to: determine a packet transmission start-up delay time of the physical port according to an identification of the physical port and the packet transmission cycle T of the network device; and an instance packet transmission start-up delay time calculation submodule, configured to: determine a packet transmission start-up delay time of an instance with the corresponding identification under each physical port according to the packet transmission start-up delay time of the physical port and instance identification(s) under the physical port, and obtain the sequence of the packet transmission start-up delay time corresponding to the plurality of instances.

Preferably, the packet transmission module comprises:

a first packet transmission submodule, configured to: in a first packet transmission cycle, transmit the protocol packets of the plurality of instances in turn according to the sequence of the packet transmission start-up delay time; and a second packet transmission submodule, configured to: in subsequent packet transmission cycles, transmit the protocol packets of the plurality of instances periodically according to the packet transmission cycle T.

The embodiments of the present document, through adopting the delay mechanism, make different ports and different instances thereof no longer perform the protocol packet transmission at the same time, which lightens the burden of the processor greatly and thus ensures the dependability and the stability of protocol operation.

EMBODIMENTS OF THE PRESENT DOCUMENTS

The preferred embodiments of the present document are described in detail in combination with the accompanying drawings hereinafter. It should be understood that, the embodiments illustrated hereinafter are used to illustrate and explain the present document, rather than limit the present document. It should be illustrated that, in the case of not conflicting, the embodiments in the present application and features in these embodiments can be combined with each other arbitrarily.

The embodiment of the present document utilizes a delay mechanism, disperses the packet transmission start-up time of various instances, and thus enables a processor to have enough time to respond to packet transmission requests of all the instances, in order to guarantee the normal operation of the protocol.

Figure 1:
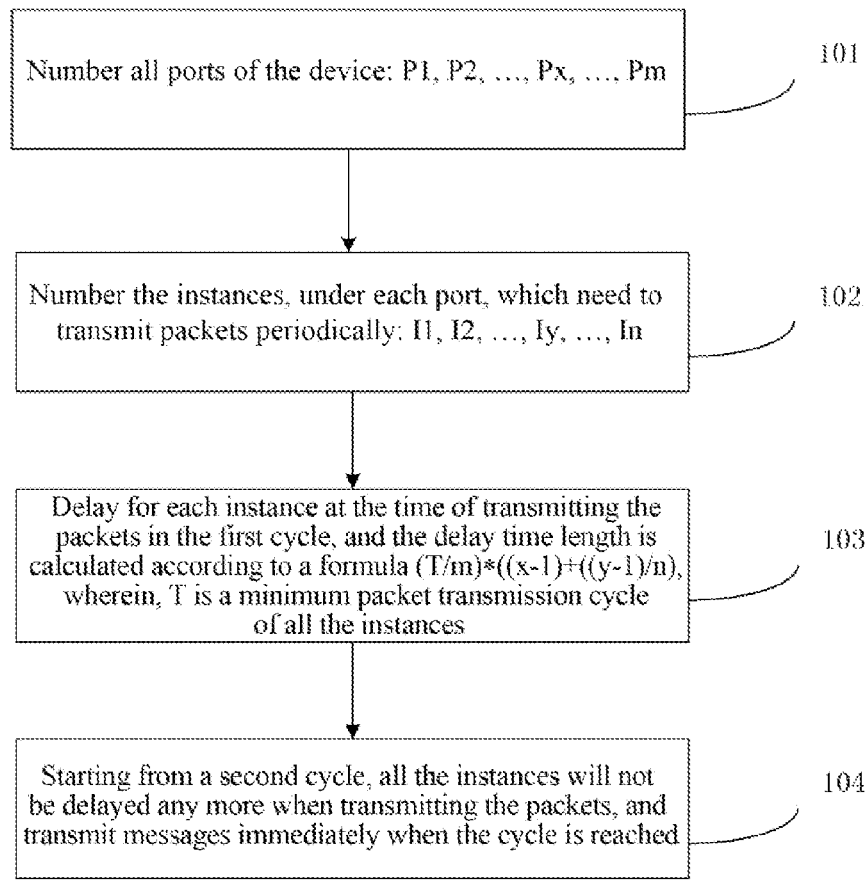
FIG. 1 is a principle block diagram of a method for periodically transmitting a protocol packet by a network device provided by an embodiment of the present document.

FIG. 1 is a principle block diagram of a method for periodically transmitting a protocol packet by a network device provided by an embodiment of the present document, and as shown in FIG. 1, the method includes the following steps.

In step 101, all physical ports of the network device are numbered, including the ports in an UP state and the ports in a DOWN state, wherein the physical ports are numbered as 1, 2, . . . , . . . , . . . , m in turn, the total number of the physical ports is m, Px represents the port with a serial number x, and $1 \leq x \leq m$. The protocol maintains a normal operation by receiving and sending corresponding protocol messages on the ports in UP, and the ports in DOWN might be changed to UP later if necessary and participate in a protocol interaction, so it is necessary to make the ports in DOWN be numbered also.

In step 102: under each physical port, it may be segment into many virtual interfaces (for example in a virtual technology), and also may be joined in a variety of protocols, and also may be needed to transmit periodically a plurality of messages (for example, the LLDP have three types of detection messages, and the target MACs of them are 01-80-C2-00-00-00, 01-80-C2-00-00-03, 01-80-C2-00-00-0E respectively) under one protocol. These virtual interfaces, protocols, sub-protocols, etc., are all defined as an instance here, and they all have demand for periodically transmitting the protocol packets. So, under each physical port, these instances are numbered respectively. If there are n instances under the port Px, then they are numbered as 1, 2, . . . , . . . , . . . , n in turn, wherein the total number of the instances under the Px port is n, Iy represents the instance with a serial number y under the Px port, and $1 \leq y \leq n$. If the number of n can be changed dynamically, then an estimated value needs to be set, which is usually the maximum number of the instances which can be supported by the physical port.

In step 103: when the instance on a certain physical port is started up, or restarted or a minimum packet transmission cycle is changed, each instance needs to request the CPU to transmit a protocol packet and performs one delay. The delay time τ is calculated according to a formula $\tau=(T/m)*((x-1)+(y-1)/n)$. Here, T is the minimum packet transmission cycle in all the instances, x is the serial number of the port Px which currently requires the CPU to transmit the packet, and y is the serial number of the instance Iy which currently requires the CPU to transmit the packet.

In step 104: after the delay transmission, if the instance is no longer restarted or the minimum packet transmission cycle is no longer adjusted, then the later packet transmission will not need to delay; and after the packet transmission cycle is reached, then the CPU is requested to transmit the packet immediately.

That is to say, one or more physical ports of a network device are identified, and one or more instances which are under each physical and need to periodically transmit protocol packets port are identified. When the plurality of instances request a processor to transmit the protocol packets at the same time, a delay processing is performed on packet transmission start-up time of the plurality of instances, so as to form a sequence of packet transmission start-up delay time corresponding to the plurality of instances; and each protocol packet of the corresponding instance are transmitted periodically according to the sequence of the packet transmission start-up delay time. Wherein, a packet transmission start-up delay time of the physical port with the corresponding identification is determined to be equal to $(T/m)*(x-1)$ according to the identification of the physical port and the packet transmission cycle T of the network device, and the packet transmission start-up delay time of the corresponding identification instance under each physical port is determined to be equal to $(T/m)*((x-1)+(y-1)/n)$ according to the packet transmission start-up delay time of the physical port and the instance identification under the physical port, so as to obtain the sequence of the packet transmission start-up delay time corresponding to the plurality of instances for the processor to transmit the protocol packets according to the sequence of time.

Figure 2:
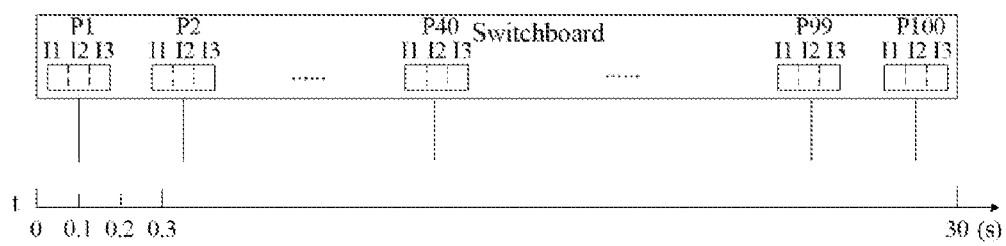
FIG. 2 is a first application topological diagram provided by an embodiment of the present document.

FIG. 2 is a first application topological diagram provided by an embodiment of the present document. As shown in FIG. 2, the switchboard has 100 physical ports and opens the LLDP protocol globally, and all the physical ports enable Nearest Bridge, Nearest Customer Bridge, Nearest Non-TPMR Bridge neighbor detections, thus the LLDP needs to send these three kinds of neighbor detection messages in these 100 physical ports. The target MACs are 01-80-C2-00-00-0E, 01-80-C2-00-00-00 and 01-80-C2-00-00-03 respectively, and the detection is performed once every other detection cycle (default 30 s). At this moment, the total number of the physical ports is 100, there are 3 instances under each port, and the minimum packet transmission cycle is 30 s.

In that way, when the LLDP protocol is started up for the first time, the packet transmission start-up delay time (transmission delay) of the neighbor detection message of the first instance I1 of the first port P1 is 0, that is, this message will be transmitted immediately; and the transmission delay of the neighbor detection message of the second instance I2 of the first port P1 is 0.1 s, that is, this message will be transmitted delaying 0.1 s after the first detection message is transmitted; the rest can be done in the same manner, the transmission delay of the neighbor detection message of the third instance I3 of the $40^{th}$ port P40 is $(30/100)*((40-1)+((3-1)/3))=11.9$ s, and the transmission delays of the three neighbor detection messages of the last port P100 are respectively 29.7 s, 29.8 s and 29.9 s.

So, the detection cycle of the I1 of the P1 is started at 0 s, and the detection cycle of the I2 of the P1 is started at 0.1 s, and so forth, the detection cycle of the I3 of the P40 is started at 11.9 s, and the detection cycles of the three instances of the P100 are started at 29.7 s, 29.8 s and 29.9 s respectively.

Starting from the second cycle, the transmission of their neighbor detection messages do not need to be delayed any more, and then, the transmission time of the detection message of the I1 of the P1 is at 30 s for the second time, and the transmission time of the detection message of the I2 of the P1 is at 30.1 s for the second time; and so forth, the transmission time of the detection message of the I3 of the P40 is at 41.9 s for the second time, and the transmission time of the detection messages of the three instances of the P100 are at 59.7 s, 59.8 s and 59.9 s respectively for the second time.

In this way, within any cycle, the switchboard can separately transmit the total 100*3=300 messages per each cycle, and only 10 LLDP messages are needed to be transmitted per second. Otherwise, if all the messages are transmitted immediately, then in each cycle the CPU needs to send out 300 LLDP messages in the extremely short time (usually smaller than 1 s), which will be a greater burden for the CPU.

Besides, all protocol messages are dispersed within one minimum cycle, which also can avoid the protocol overtime which is at least 3 times of the detection cycle.

Figure 3:
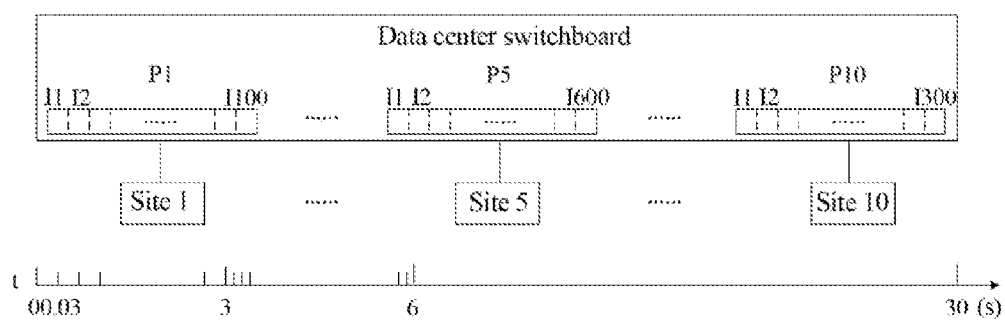
FIG. 3 is a second application topological diagram provided by an embodiment of the present document.

FIG. 3 is a second application topological diagram provided by an embodiment of the present document. As shown in FIG. 3, the switchboard has 10 physical ports which are connected to different sites respectively, and the switchboard is a data center switchboard. All the physical ports apply a data center virtual technology, that is, there are several virtual interfaces under each physical port, the LLDP protocol is started globally. Each virtual interface needs to interact an EVB protocol with a virtual interface corresponding to a site, and EVB TLV is encapsulated in an LLDP message; the virtual interfaces respectively maintain their own EVB information independent of each other and respective TLV is encapsulated and transmitted independently, and how many EVB TLVs need to be transmitted is based on how many virtual interfaces the device has, therefore there may be many LLDP messages need to be transmitted periodically in which the number of the LLDP messages is the same as that of EVB TLVs.

If the port 1 has 100 virtual interfaces, the port 5 has 600 virtual interfaces, the port 10 has 300 virtual interfaces, and each of other 7 ports have 200 virtual interfaces respectively, then there will be 2400 virtual interfaces totally, i.e., there are 2400 LLDP messages which are needed to be transmitted periodically.

Here, if each virtual interface corresponds to an instance, there are 100 instances under the P1, there are 600 instances under the P5, there are 300 instances under the P10, and there are 200 instances respectively under each of the other ports. The transmission interval of the LLDP messages is default 30 s. Because the numbers of the instances under each port are different, the transmission delays of these detection messages are not distributed evenly when the protocol is started up.

After the protocol is started up, in the first detection cycle, the delay of I1 of P1 is 0, the delay of I2 of P1 is 0.03 s, the delay of I100 of P1 is 2.97 s; the delay of I1 of P5 is 12 s, the delay of I2 of P5 is 12.005 s, the delay of I3 of the P5 is 12.01 s, and the rest can be done in the same manner.

Starting from the second detection cycle, the transmission of the detection messages will not be delayed any more, so as to guarantee that in each cycle these 2400 LLDP messages can be separately transmitted. The CPU only needs to transmit 80 LLDP messages per second, which lightens the burden of the CPU greatly.

In addition, as to the number of the virtual interfaces under each port, that value may be dynamically changed frequently, so here it is suggested to provide an estimated value for the number of the instances under each port, while not adopting the actual value. For the virtual interface exceeding the estimated value, the message transmission can only be performed at the same time with the virtual interface having the previous serial number of the virtual interface exceeding the estimated value.

Figure 4:
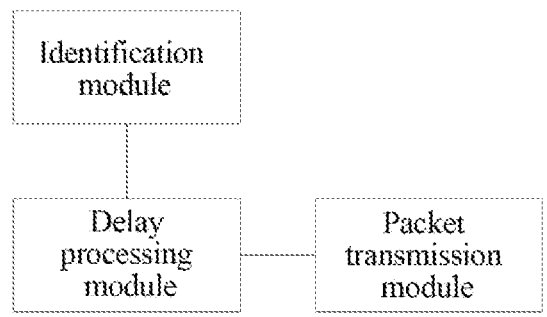
FIG. 4 is a block diagram of an apparatus for periodically transmitting a protocol packet by a network device provided by an embodiment of the present document.

FIG. 4 is a block diagram of an apparatus for periodically transmitting a protocol packet by a network device provided by an embodiment of the present document, and as shown in FIG. 4, the apparatus includes an identification module, a delay processing module, and a packet transmission module.

The identification module is configured to: identify one or more physical ports of the network device, and identify one or more instances, under each physical port, which need to periodically transmit the protocol packet.

The delay processing module is configured to: perform delay processing on packet transmission start-up time of a plurality of instances when the plurality of instances request a processor to transmit protocol packets at the same time, and form a sequence of packet transmission start-up delay time corresponding to the plurality of instances. The delay processing module further includes:

a network device packet transmission cycle calculation submodule, configured to: compare packet transmission cycles of the plurality of instances, obtain a minimum packet transmission cycle, and taking the minimum packet transmission cycle as a packet transmission cycle T of the network device;

a network device packet transmission start-up delay time calculation submodule, configured to: determine a packet transmission start-up delay time of the physical port with the corresponding identification according to an identification of the physical port and the packet transmission cycle T of the network device; and an instance packet transmission start-up delay time calculation submodule, configured to: determine a packet transmission start-up delay time of an instance with the corresponding identification under each physical port according to the packet transmission start-up delay time of the physical port and instance identification(s) under the physical port, and obtain the sequence of the packet transmission start-up delay time corresponding to the plurality of instances.

The packet transmission module is configured to: periodically transmit the protocol packet of the corresponding instance according to the sequence of the packet transmission start-up delay time. The packet transmission module includes:

a first packet transmission submodule, configured to: in a first packet transmission cycle, transmit the protocol packets of the plurality of instances in turn according to the sequence of the packet transmission start-up delay time; and a second packet transmission submodule, configured to: in subsequent packet transmission cycles, transmit the protocol packets of the plurality of instances periodically according to the packet transmission cycle T.

Supposing that the network device have m physical ports, the identification module numbers them as 1, 2, 3, . . . , . . . , m in turn, under each port there are several instances which need to transmit the protocol packets (the instances here refer to objects with the demand of the CPU transmitting the packets, including the virtual interfaces, different protocols or sub-protocols, etc.), and there are n instances under the $x^{th}$ port and the identification module numbers these instances as 1, 2, 3, . . . , . . . , n in turn. Each instance has one packet transmission cycle, and the packet transmission cycles are usually the same for the same protocol. Supposing that the minimum packet transmission cycle of all the instances under all the ports is T, the minimum packet transmission cycle T is regarded as the packet transmission cycle T of the network device.

After the protocol is started up, the ports are UP and the instances are started up, the CPU will roll polling each instance of each port to prepare for transmitting the protocol messages for the first time, and at this moment each instance is set an initial protocol packet transmission delay. First of all, all the instances under all the ports need to send out the messages in a shortest cycle T, this period of time is equally distributed by these m ports, then the time distributed for all the instances under each port is T/m; and then, if there are n instances under the $x^{th}$ port, the time distributed to each instance is T/m/m; thus for the $y^{th}$ instance of the $x^{th}$ port, its initial protocol packet transmission delay (the packet transmission start-up delay time of the $y^{th}$ instance of the $x^{th}$ port) is: $(T/m)*((x-1)+(y-1)/n)$.

In this way, when the packet is transmitted for the first time, the first instance under the first port will transmit the packet immediately, while the last instance of the last port will transmit the packet after a delay $T*(m*n-1)/m*n$, and other instances will transmit the packet also after delaying a certain time within a range (0,T) respectively.

Then each instance maintains its own timer respectively, and respective instance will transmit the packet immediately when the cycle is reached without delay transmission. Thus, it makes the transmitting the protocol packets under different ports and/or different instances under the port no longer perform at the same time, which will lighten the burden of the CPU greatly.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

Although the above text describes the present document in detail, the present document is not limited to that. Those skilled in the art can make various modifications according to the principles of the present document. Therefore, it should be understood that all the modifications made according to the principles of the present document are embodied in the protection scope of the present document.

INDUSTRIAL APPLICABILITY

The embodiments of the present document, through adopting the delay mechanism, make different ports and different instances thereof no longer perform the protocol packet transmission at the same time, which lightens the burden of the processor greatly and thus ensures the dependability and the stability of protocol operation.

What I claim is:

1. A method for periodically transmitting a protocol packet by a network device, comprising:
    identifying one or more physical ports of the network device;
    identifying one or more instances, of each physical port, which is needed to periodically transmit the protocol packet;
    performing delay processing on protocol packet transmission start-up time of the one or more instances when the one or more instances request a processor to transmit protocol packets at the same time, so as to form a sequence of protocol packet transmission start-up delay time corresponding to the one or more instances; and
    the processor periodically transmitting the protocol packet corresponding to the one or more instances according to the sequence of the protocol packet transmission start-up delay time.

2. The method according to claim 1, further comprising: comparing protocol packet transmission cycles of the one or more instances, obtaining a minimum protocol packet transmission cycle, and taking the minimum protocol packet transmission cycle as a protocol packet transmission cycle T of the network device.

3. The method according to claim 2, wherein, the step of the delay processing comprises:
    determining a protocol packet transmission start-up delay time of each physical port according to an identification of each physical port and the protocol packet transmission cycle T of the network device, and determining a protocol packet transmission start-up delay time of an instance with the corresponding identification under each physical port according to the protocol packet transmission start-up delay time of the physical port and instance identification(s) under the physical port, and obtaining the sequence of the protocol packet transmission start-up delay time corresponding to the one or more instances.

4. The method according to claim 3, wherein, the protocol packet transmission start-up delay time $\tau_1$ of the physical port is calculated through the following formula:

$$\tau_1 = (T/m) \ast (x-1)$$

wherein, m is a total number of the physical ports, x is a serial number of the physical port, and $1 \leq x \leq m$.

5. The method according to claim 4, wherein, the protocol packet transmission start-up delay time $\tau_2$ of the instance with the corresponding identification is calculated through the following formula:

$$\tau_2 = (T/m) \ast ((x-1) + (y-1)/n)$$

wherein, n is a total number of the instances under the $x^{th}$ physical port, y is a serial number of an instance under the $x^{th}$ physical port, and $1 \leq y \leq n$.

6. The method according to claim 5, wherein, in a first protocol packet transmission cycle of the network device, the protocol packets of the plurality of instances are transmitted in turn according to the sequence of the protocol packet transmission start-up delay time, and in subsequent protocol packet transmission cycles, the protocol packets of the one or more instances are transmitted periodically according to the protocol packet transmission cycle T.

7. The method according to claim 1, wherein, the instances comprise virtual interfaces, protocols or sub-protocols which is needed to periodically transmit the protocol packet.

8. The method according to claim 2, wherein, the instances comprise virtual interfaces, protocols or sub-protocols which is needed to periodically transmit the protocol packet.

9. The method according to claim 3, wherein, the instances comprise virtual interfaces, protocols or sub-protocols which is needed to periodically transmit the protocol packet.

10. The method according to claim 4, wherein, the instances comprise virtual interfaces, protocols or sub-protocols which is needed to periodically transmit the protocol packet.

11. The method according to claim 5, wherein, the instances comprise virtual interfaces, protocols or sub-protocols which is needed to periodically transmit the protocol packet.

12. The method according to claim 6, wherein, the instances comprise virtual interfaces, protocols or sub-protocols which is needed to periodically transmit the protocol packet.

13. An apparatus for periodically transmitting a protocol packet by a network device, comprising a hardware processor, and a non-transitory processor-readable medium storing processor executable instructions that when executed by the processor cause the processor to perform steps in an identification module, a delay processing module and a protocol packet transmission module, wherein:
    the identification module is configured to: identify one or more physical ports of the network device, and identify one or more instances of each physical port, which is needed to periodically transmit the protocol packet;
    the delay processing module is configured to: perform delay processing on protocol packet transmission start-up time of the one or more instances when the one or more instances request a processor to transmit protocol packets at the same time, and form a sequence of protocol packet transmission start-up delay time corresponding to the one or more instances; and
    the protocol packet transmission module is configured to: periodically transmit the protocol packet corresponding to the one or more instances according to the sequence of the protocol packet transmission start-up delay time.

14. The apparatus according to claim 13, wherein, the delay processing module comprises:
    a network device protocol packet transmission cycle calculation sub-module, configured to: compare protocol packet transmission cycles of the one or more instances, obtain a minimum protocol packet transmission cycle, and taking the minimum protocol packet transmission cycle as a protocol packet transmission cycle T of the network device;
    a network device protocol packet transmission start-up delay time calculation sub-module, configured to: determine a protocol packet transmission start-up delay time of each physical port according to an identification of each physical port and the protocol packet transmission cycle T of the network device; and
    an instance protocol packet transmission start-up delay time calculation sub-module, configured to: determine a protocol packet transmission start-up delay time of an instance with the corresponding identification under each physical port according to the protocol packet transmission start-up delay time of the physical port and instance identification(s) under the physical port, and obtain the sequence of the protocol packet transmission start-up delay time corresponding to the one or more instances.

15. The apparatus according to claim 14, wherein, the protocol packet transmission module comprises:
- a first protocol packet transmission sub-module, configured to: in a first protocol packet transmission cycle, transmit the protocol packets of the plurality of instances in turn according to the sequence of the protocol packet transmission start-up delay time; and
- a second protocol packet transmission sub-module, configured to: in subsequent protocol packet transmission cycles, transmit the protocol packets of the plurality of instances periodically according to the protocol packet transmission cycle T.

\* \* \* \* \*